(12) United States Patent
Mizusaki et al.

(10) Patent No.: US 10,597,015 B2
(45) Date of Patent: Mar. 24, 2020

(54) BRAKING SYSTEM AND VEHICLE

(71) Applicant: HITACHI AUTOMOTIVE SYSTEMS, LTD., Ibaraki (JP)

(72) Inventors: Takanori Mizusaki, Atsugi (JP); Takato Suzuki, Atsugi (JP); Yasufumi Konishi, Atsugi (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 51 days.

(21) Appl. No.: 16/082,373

(22) PCT Filed: Mar. 16, 2017

(86) PCT No.: PCT/JP2017/010670
§ 371 (c)(1),
(2) Date: Sep. 5, 2018

(87) PCT Pub. No.: WO2017/203806
PCT Pub. Date: Nov. 30, 2017

(65) Prior Publication Data
US 2019/0061727 A1 Feb. 28, 2019

(30) Foreign Application Priority Data

May 26, 2016 (JP) .................. 2016-105119

(51) Int. Cl.
*B60T 13/74* (2006.01)
*B60T 8/172* (2006.01)
(Continued)

(52) U.S. Cl.
CPC ............. *B60T 13/74* (2013.01); *B60R 16/03* (2013.01); *B60T 8/00* (2013.01); *B60T 8/172* (2013.01);
(Continued)

(58) Field of Classification Search
CPC ... B60T 7/042; B60T 8/00; B60T 8/17; B60T 8/172; B60T 13/02; B60T 13/74;
(Continued)

(56) References Cited

U.S. PATENT DOCUMENTS 8,447,487 B2 * 5/2013 Nishino .................. B60T 7/042
701/78
8,506,020 B2 * 8/2013 Nishino ..................... B60T 1/10
303/122.04

(Continued)

FOREIGN PATENT DOCUMENTS

| JP | 2010-110192 | 5/2010 |
|---|---|---|
| JP | 2010-120624 | 6/2010 |

(Continued)

OTHER PUBLICATIONS

International Search Report dated Jun. 20, 2017 in International (PCT) Application No. PCT/JP2017/010670.

*Primary Examiner* — Thomas J Williams
(74) *Attorney, Agent, or Firm* — Wenderoth, Lind & Ponack, L.L.P.

(57) ABSTRACT

A braking system includes an electric motor configured to output a braking force, and a controller configured to control the electric motor. The controller is supplied with electric power from both a main power source and an auxiliary power source. The electric motor has a first state in which the electric motor is supplied with electric power from the main power source when the main power source has a voltage V1 equal to or higher than a threshold value Va; a second state in which the electric motor is supplied with electric power from the auxiliary power source, and the voltage V1 of the main power source is lower than the threshold value Va; and a third state in which the electric motor is supplied with electric power from the main power (Continued)

source, and the voltage V1 of the main power source is lower than the threshold value Va.

6 Claims, 4 Drawing Sheets

(51) Int. Cl.
  *B60T 8/00* (2006.01)
  *H02J 7/00* (2006.01)
  *H02J 7/14* (2006.01)
  *B60R 16/03* (2006.01)
  *B60T 8/32* (2006.01)
  *B60T 8/40* (2006.01)

(52) U.S. Cl.
  CPC .......... *B60T 13/745* (2013.01); *H02J 7/0054* (2013.01); *H02J 7/1423* (2013.01); *B60T 8/321* (2013.01); *B60T 8/4077* (2013.01); *B60T 2220/04* (2013.01); *B60T 2270/414* (2013.01)

(58) Field of Classification Search
  CPC .. B60T 13/745; B60T 13/588; B60T 2220/04; B60T 2270/414; B60R 16/03
  USPC .......................................................... 303/20
  See application file for complete search history.

(56) References Cited

U.S. PATENT DOCUMENTS

| | | | |
|---|---|---|---|
| 9,278,676 B2* | 3/2016 | Nishino | B60T 7/042 |
| 10,340,106 B2* | 7/2019 | Kato | H01H 47/001 |
| 2005/0269870 A1* | 12/2005 | Ohashi | B60R 16/023 303/20 |
| 2011/0266106 A1* | 11/2011 | Suzuki | B60T 7/042 188/360 |
| 2013/0082514 A1* | 4/2013 | Murakami | B60T 13/686 303/14 |
| 2017/0036659 A1* | 2/2017 | Murakami | B60T 7/042 |

FOREIGN PATENT DOCUMENTS

| | | |
|---|---|---|
| JP | 2015-061424 | 3/2015 |
| JP | 2015-136263 | 7/2015 |

* cited by examiner

BRAKING SYSTEM AND VEHICLE

TECHNICAL FIELD

The invention relates to electric braking systems and vehicles equipped with the braking systems.

BACKGROUND ART

The braking systems installed in vehicles, such as four-wheeled vehicles, include the ones (so-called electric boosters) configured to electrically control the brake fluid pressure generated in master cylinders in order to supply brake fluid to wheel cylinders of the vehicles. These braking systems each have an electric motor which outputs a braking force in accordance with a braking demand signal, and a controller which controls the electric motor (see Patent Literature 1, for example).

According to the braking system described in the Patent Literature 1, when a main power source is decreased in its remaining power, electric power is supplied to a controller from an auxiliary power source. If the remaining power of the main power source is further decreased, an electric motor is also supplied with electric power from the auxiliary power source.

CITATION LIST

Patent Literature

PTL 1: Japanese Unexamined Patent Application Publication (Kokai) No. 2010-120624

SUMMARY OF INVENTION

Technical Problem

According to the braking system described in the Patent Literature 1, the controller is likely to be reset when the main power source is temporarily decreased in voltage at the starting of the engine. In that context, if the braking system of the Patent Literature 1 is installed in, for example, a vehicle with an idling stop function which repeats the starting and stopping of the engine, the electric power supply to the controller and the electric motor will be switched from the main power source to the auxiliary power source every time the voltage is decreased due to the starting of the engine. This increases the frequency of use of the auxiliary power source, and thus might decrease the remaining power of the auxiliary power source.

It is an object of the invention to provide a braking system capable of preventing reset of a controller and preventing electric power consumption of an auxiliary power source at the starting of an engine, and a vehicle equipped with the braking system.

Solution to Problem

A braking system according to one embodiment of the invention comprises an electric motor configured to output a braking force in accordance with a braking demand signal, and a controller configured to control the electric motor. The electric motor and the controller are supplied with electric power from a first power storage device which supplies electric power to a starting system of an internal combustion engine installed in a vehicle, and a second power storage device which is independent from the first power storage device. The controller is supplied with electric power from both the first and second power storage devices. The electric motor has a first state in which the electric motor is supplied with electric power from the first power storage device when the first power storage device has a voltage equal to or higher than a first predetermined value, a second state in which the electric motor is supplied with electric power from the second power storage device when the starting system is not being driven, and the first power storage device has a voltage lower than the first predetermined value, and a third state in which the electric motor is supplied with electric power from the first power storage device when the starting system is being driven, and the first power storage device has a voltage lower than the first predetermined value.

A braking system according to one embodiment of the invention comprises an electric motor configured to generate a braking force in accordance with a braking demand signal, and a controller configured to control the electric motor. The electric motor and the controller are supplied with electric power from a first power storage device which supplies electric power to a starting system of an internal combustion engine installed in a vehicle, and a second power storage device which is independent from the first power storage device. The electric power supply from the second power storage device has a fourth state in which the second power storage device supplies electric power to the electric motor and the controller when the first power storage device has a voltage lower than a first predetermined value, a fifth state in which the second power storage device does not supply electric power to the electric motor, but supplies electric power to the controller, on the condition that the starting system is being driven, and a sixth state in which the second power storage device does not supply electric power to the electric motor and the controller.

A vehicle according to one embodiment of the invention comprises an electric motor configured to generate a braking force in accordance with a braking demand signal; a controller configured to control the electric motor; a starting system configured to start an internal combustion engine; a first power storage device configured to supply electric power to the starting system; a second power storage device which is independent from the first power storage device; and a power supply controlling section configured to control the power supply from the first and second power storage devices to the electric motor and the controller. The power supply controlling section switches the power supply from the second power storage device to a fourth state in which the second power storage device supplies electric power to the electric motor and the controller when the first power storage device has a voltage lower than a first predetermined value, a fifth state in which the second power storage device does not supply electric power to the electric motor, but supplies electric power to the controller, on the condition that the starting system is being driven, and a sixth state in which the second power storage device does not supply electric power to the electric motor and the controller.

The one embodiments of the invention make it possible to prevent the controller from being reset due to voltage reduction in the main power source and thus prevent power consumption of the auxiliary power source.

DESCRIPTION OF EMBODIMENTS

A braking system according to an embodiment will be described below with an example in which the braking system is applied to a four-wheel vehicle, with reference to FIGS. 1 to 4 attached hereto.

Figure 1:
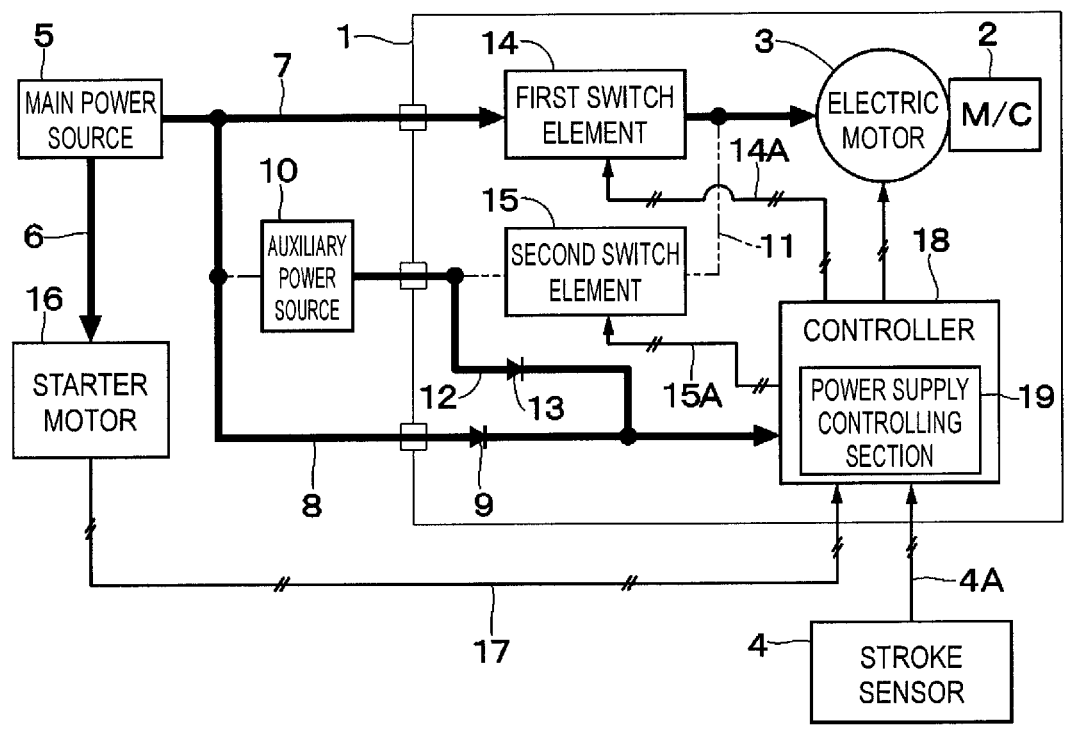
FIG. 1 is a configuration diagram in which an electric motor receives power supply from a main power source.

Referring to FIG. 1, a braking system 1 provides a braking force in order to stop the vehicle. The braking system 1 is configured as an electric boosting apparatus (electric booster) which electrically controls brake fluid pressure that is generated in a master cylinder (M/C) 2 to supply brake fluid to a wheel cylinder, not shown, of the vehicle. The braking system 1 therefore includes an electric motor 3 and a controller 18 configured to control the electric motor 3.

The electric motor 3 outputs a braking force in accordance with a braking demand signal. The electric motor 3 is configured as an electrical motor of the electric boosting apparatus including, for example, a brushless DC motor. The controller 18 discussed later controls the driving of the electric motor 3. The electric motor 3 activates a piston, not shown, which is disposed in the master cylinder 2 to generate the brake fluid pressure within the master cylinder 2 on the basis of amount of operation (pedal depression) of a brake pedal, not shown.

A stroke sensor 4 detects the amount of the brake pedal operation (pedal depression) performed by an operator. The stroke sensor 4 is connected to the controller 18 through a signal line 4A. A detection signal of the stroke sensor 4 is outputted to the controller 18 as a braking demand signal of the invention.

The main power source 5 is a battery installed in the vehicle. The main power source 5 is configured as a first power storage device of the invention. The main power source 5 stores electric power of a generator, not shown, which generates electric power by being rotationally driven by an engine, not shown. The main power source 5 is connected through a power-supply line 6 to a starter motor 16 which is an electric motor for starting the engine. The main power source 5 supplies electric power to the starter motor 16 when the starter motor 16 is driven.

The main power source 5 is connected to the electric motor 3 through a power-supply line 7 which is a different line from the power-supply line 6. A first switch element 14 is provided in the power-supply line 7. The main power source 5 supplies electric power to the electric motor 3 when the first switch element 14 is turned to an ON position (connected position). The main power source 5 is connected to the controller 18 through a power-supply line 8 which is a different line from the power-supply lines 6 and 7. A diode 9 is provided in the power-supply line 8. The diode 9 allows electric current to flow from the main power source 5 toward the controller 18 and blocks electric current from flowing in the other direction. The main power source 5 supplies electric power to the controller 18. The main power source 5 further supplies electric power to other electric devices (controllers) and the like devices installed in the vehicle.

An auxiliary power source 10 is a battery or a capacitor, which is installed in the vehicle. The auxiliary power source 10 is configured as a second power storage device of the invention. The auxiliary power source 10 has a smaller capacity than, for example, the main power source 5, and stores the electric power from the generator and the main power source 5. While the power supply of the main power source 5 and the auxiliary power source 10 is being suspended, for example, the auxiliary power source 10 has voltage V2 which is set equal to or lower than voltage V1 of the main power source 5 ($V2 \leq V1$).

The auxiliary power source 10 is connected to the electric motor 3 through an auxiliary power-supply line 11. A second switch element 15 is provided in the auxiliary power-supply line 11. The auxiliary power source 10 supplies electric power to the electric motor 3 when the second switch element 15 is turned to an ON position (connected position). The auxiliary power source 10 is connected to the controller 18 through an auxiliary power-supply line 12 which is a different line from the auxiliary power-supply line 11. A diode 13 is provided in the auxiliary power-supply line 12. The diode 13 allows electric current to flow from the auxiliary power source 10 toward the controller 18 and blocks electric current from flowing in the other direction. The auxiliary power source 10 supplies electric power to the controller 18. The auxiliary power source 10 may be disposed within the braking system 1.

The electric motor 3 is thus connected to the main power source 5 via the first switch element 14 and to the auxiliary power source 10 via the second switch element 15. The electric motor 3 is allowed to receive the power supply from the main power source 5 when the first switch element 14 is turned to the ON position (connected position), and cannot receive the power supply from the main power source 5 when the first switch element 14 is turned to an OFF position (disconnected position). The electric motor 3 is allowed to receive the power supply from the auxiliary power source 10 when the second switch element 15 is turned to the ON position (connected position), and cannot receive the power supply from the auxiliary power source 10 when the second switch element 15 is turned to an OFF position (disconnected position). Whether the electric motor 3 receives the power supply from the main power source 5 or from the auxiliary power source 10 will be explained later in details.

The first switch element 14 is provided in the power-supply line 7 connecting the main power source 5 and the electric motor 3. The second switch element 15 is provided in the auxiliary power-supply line 11 connecting the auxiliary power source 10 and the electric motor 3. The first switch element 14 comprises, for example, an electromagnetic relay or the like. The first switch element 14 is connected through a signal line 14A to the controller 18 discussed later. Likewise, the second switch element 15 comprises, for example, an electromagnetic relay or the like, and is connected through a signal line 15A to the controller 18 discussed later.

The first switch element 14 and the second switch element 15 are switched between the connected position (ON position) and the disconnected position (OFF position) on the basis of a control signal from the controller 18 discussed later. More specifically, when the first switch element 14 is in the ON position, the main power source 5 and the electric motor 3 are connected to each other, which means that the electric motor 3 is allowed to receive the power supply from the main power source 5. When the second switch element 15 is in the ON position, the auxiliary power source 10 and the electric motor 3 are connected to each other, so that the electric motor 3 is allowed to receive the power supply from the auxiliary power source 10.

The starter motor 16 is an electrical motor which operates at the starting of the engine. To be more specific, the starter motor 16 operates when the operator turns on an engine starting switch (ignition switch) or an engine re-starting switch (idle switch), neither shown, (performs a starting operation). The starter motor 16 is connected to the main power source 5 through the power-supply line 6 and supplied with electric power from the main power source 5.

The starter motor 16 is connected to the controller 18 through the signal line 17 and outputs to the controller 18 a starting detection signal representing that the starter motor 16 is being driven. The starter motor 16 is configured as a starting system for starting the internal combustion engine of the invention.

The controller 18 controls the electric motor 3 and forms a part of the braking system 1. The controller 18 comprises, for example, a microcomputer or the like. The controller 18 is formed as a master pressure control unit which controls the driving of the electric motor 3 of the electric boosting apparatus to generate brake fluid pressure within the master cylinder 2. Electrically connected to an input side of the controller 18 are the stroke sensor 4, the main power source 5, the auxiliary power source 10, the starter motor 16, and the like. Electrically connected to an output side of the controller 18 are the electric motor 3 (inverter circuit or another like element of the electric motor 3), the first switch element 14, and the second switch element 15.

The controller 18 receives a detection value of the stroke sensor 4, which is obtained on the basis of the brake pedal operation by the operator. The controller 18 activates the electric motor 3 on the basis of the detection signal (braking demand signal) of the stroke sensor 4 and generates the brake fluid pressure within the master cylinder 2. The controller 18 is electrically connected to the starter motor 16 through the signal line 17. The controller 18 receives the starting detection signal from the starter motor 16 and thus detects whether the starter motor 16 is in operation.

The controller 18 receives the power supply from both the main power source 5 and the auxiliary power source 10. The diode 9 is provided in the power-supply line 8 connecting the main power source 5 and the controller 18. The diode 13 is provided in the auxiliary power-supply line 12 connecting the auxiliary power source 10 and the controller 18. The controller 18 is supplied with voltage from either the main power source 5 or the auxiliary power source 10, whichever has higher voltage. Even when the voltage of the main power source 5 is temporarily decreased lower than that of the auxiliary power source 10, the controller 18 is applied with the voltage of the auxiliary power source 10 due to the driving of the starter motor 16. The controller 18 is therefore prevented from being reset.

The controller 18 includes a power supply controlling section 19. The power supply controlling section 19 controls the ON position (connected position) or the OFF position (disconnected position) of the first and second switch elements 14 and 15, to thereby control whether electric power is supplied to the electric motor 3 from the main power source 5 or from the auxiliary power source 10. The power supply controlling section 19 has a memory, not shown, which stores a program for a control process illustrated in FIGS. 3 and 4 and threshold values (Va, Vb) of the voltage of the main power source 5. The power supply controlling section 19 executes the switching operation of the first and second switch elements 14 and 15 in accordance with the program of the control process illustrated in FIGS. 3 and 4.

To be more specific, the power supply controlling section 19 receives a detection signal corresponding to the voltage of the main power source 5, which is detected from a voltage detection circuit, not shown, and a detection signal corresponding to the voltage of the auxiliary power source 10, which is detected from a voltage detection circuit, not shown. On the basis of the voltage of the main power source 5, the power supply controlling section 19 makes a determination as to whether electric power should be supplied to the electric motor 3 from the main power source 5 or from the auxiliary power source 10. The power supply controlling section 19 further detects whether the starter motor 16 is being driven, whether the braking force which can be generated by the electric motor 3 is deficient, and whether the brake pedal is being depressed. The power supply controlling section 19 then determines whether electric power should be supplied to the electric motor 3 from the main power source 5 or from the auxiliary power source 10. The power supply controlling section 19 may be provided to another controller which is electrically connected to the controller 18.

The braking system according to the present embodiment is configured in the above-described manner. The following description will explain the operation of the braking system.

When the vehicle operator depresses the brake pedal, the controller 18 controls the activation of the electric motor 3 on the basis of the detection value of the stroke sensor 4 which detects the brake pedal depression amount. The brake fluid pressure which is generated within the master cylinder 2 in response to the activation of the electric motor 3 is divided for and supplied to a front wheel brake and a rear wheel brake. Thus braking forces are respectively applied to right and left front wheels and right and left rear wheels. After the vehicle is parked for a predetermined period of time (1 to 3 seconds, for example), idling stop control takes place, which stops the driving of the engine.

In response to a vehicle starting operation (for example, operation of the engine re-starting switch for re-starting the engine or another like operation), the starter motor 16 is driven to re-start the engine. When the vehicle operator releases the brake pedal, the brake fluid is slowly returned from the front and rear wheel brakes to the master cylinder 2. The braking forces are then stopped from being applied by the front and rear wheel brakes.

In this situation, the starter motor 16 is driven by being supplied with electric power from the main power source 5. In addition, the main power source 5 further supplies electric power to the controller 8. For these reasons, when the voltage of the main power source 5 is temporarily decreased at the time of driving of the starter motor 16, the controller 18 is likely to be reset.

In such a case, according to the Patent Literature 1, when a main power source is decreased in its remaining power, power supply to a controller is switched from the main power source to an auxiliary power source. If the main power source is further decreased in its remaining power, an electric motor is also supplied with electric power from the auxiliary power source.

However, if the driving and stopping of the engine repeatedly take place due to idling stop control, there is a possibility that power supply to the controller and the electric motor is switched from the main power source to the auxiliary power source every time the main power source is decreased in voltage by driving a starter motor at the re-starting of the engine. The auxiliary power source is accordingly used with great frequency, which raises a possibility that the auxiliary power source is decreased in its remaining power.

To solve the foregoing issue, the embodiment of the invention supplies electric power to the controller 18 from both the main power source 5 and the auxiliary power source 10. When the voltage of the main power source 5 is decreased, the power supplied to the electric motor 3 is switched from the main power source 5 to the auxiliary power source 10 on the basis of the driving of the starter motor 16, the amount of the braking force generated by the electric motor 3, and operation or non-operation of brake pedal.

Figure 3:
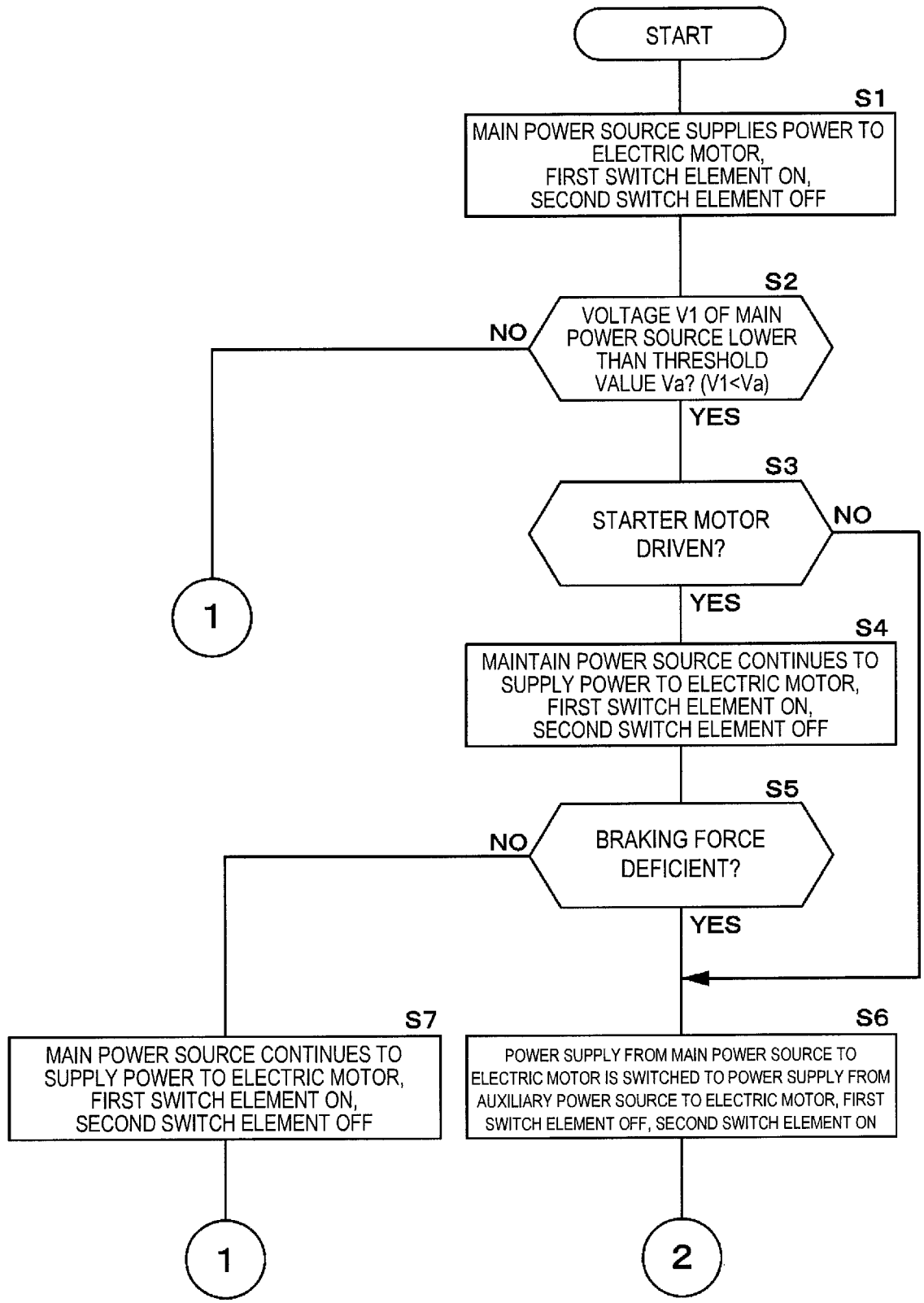
FIG. 3 is a flowchart showing a control process which is performed in a power supply controlling section illustrated in FIGS. 1 and 2.
Figure 4:
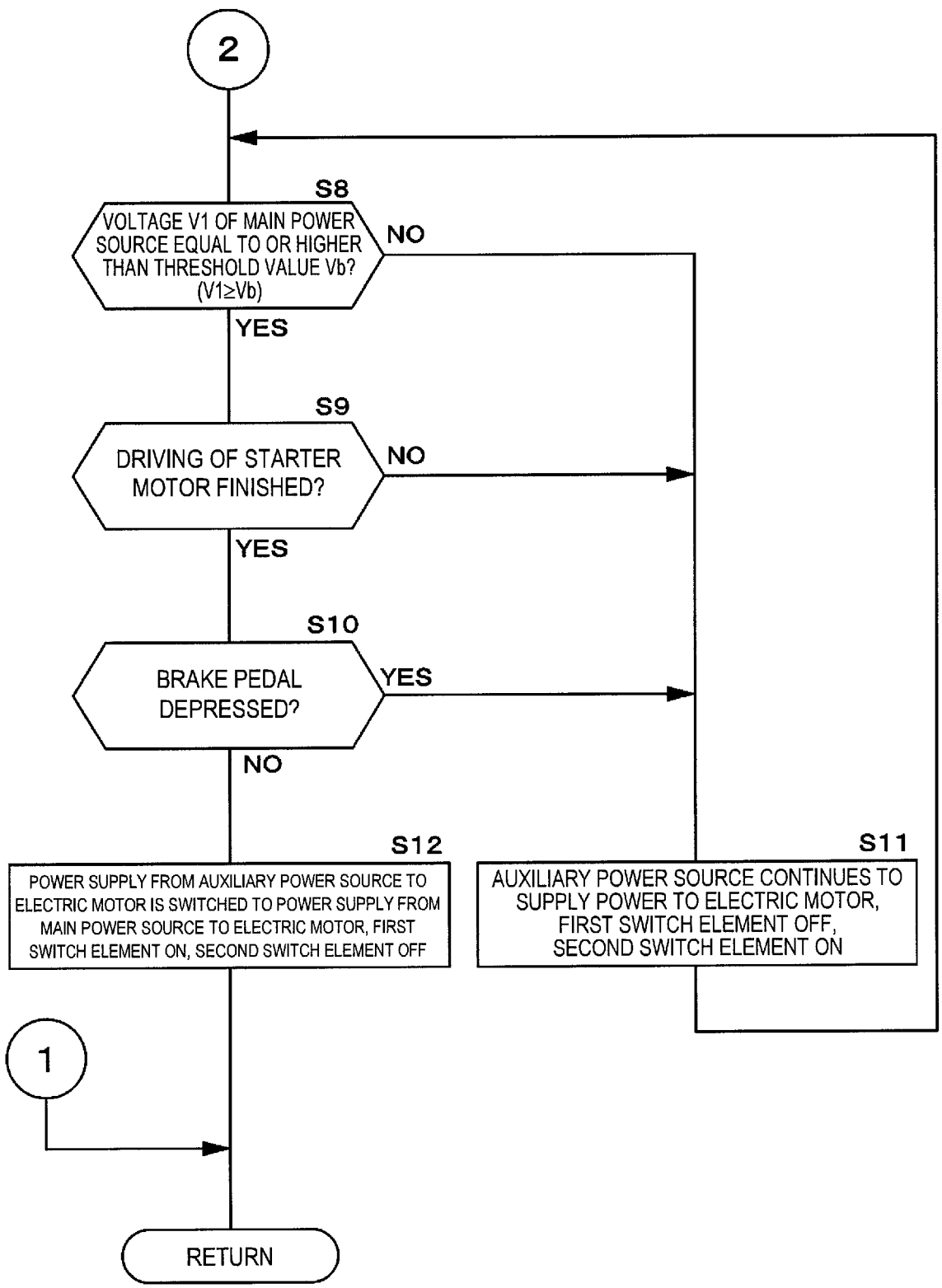
FIG. 4 is a flowchart showing subsequent steps of the control process illustrated in FIG. 3.

The following description will explain whether the power supply to the electric motor 3 is performed by the main power source 5 or by the auxiliary power source 10, with reference to the control process illustrated in FIGS. 3 and 4. The control process in FIGS. 3 and 4 is repeatedly executed with respect to each predetermined cycle, for example, after the engine starting switch is turned on. The letter "S" in the flowchart illustrated in FIGS. 3 and 4 represents a step. For example, a step 1 is indicated as "S1".

Once a processing operation illustrated in FIG. 3 starts, the power controlling section 19 of the controller 18 executes S1 so that electric power is supplied to the electric motor 3 from the main power source 5. More specifically, the power supply controlling section 19 turns on the first switch element 14 (connected position) and turns off the second switch element 15 (disconnected position). As shown in FIG. 1, the electric motor 3 receives the power supply from the main power source 5. The controller 18 is allowed to receive the power supply from the main power source 5 and the auxiliary power source 10. In this case, the voltage V1 of the main power source 5 is higher than the voltage V2 of the auxiliary power source 10 (V2<V1), so that the controller 18 receives the power supply from the main power source 5. The above-described state corresponds to a sixth state of the invention, in which the auxiliary power source 10 does not supply electric power to the electric motor 3 and the controller 18.

The subsequent S2 makes a determination as to whether the voltage V1 of the main power source 5 is lower than the threshold valve Va (V1<Va). More specifically, the power supply controlling section 19 detects the voltage V1 of the main power source 5 on the basis of the detection signal from the voltage detection circuit and compares the voltage V1 with the threshold value Va. In this case, the threshold value Va is set slightly higher than such a voltage that the electric motor 3 and the controller 18 are inactivated (stopped). The threshold value Va is the first predetermined value of the invention.

If S2 determines "YES," which means that the voltage V1 of the main power source 5 is lower than the threshold vale Va, the process advances to S3. If S2 determines "NO," which means that the voltage V1 of the main power source 5 is equal to or higher than the threshold value Va, the process returns to the start. The state where the electric motor 3 receives the power supply from the main power source 5 as the result of the "NO" determination in S2 makes a first state of the invention. The controller 18, too, receives the power supply from the main power source 5, which corresponds to the sixth state of the invention.

S3 makes a determination as to whether the starter motor 16 is being driven. More specifically, the power supply controlling section 19 determines, on the basis of the detection signal from the starter motor 16, whether the starter motor 16 is being driven to start (or restart) the engine. If S3 determines "YES," which means that the starter motor 16 is being driven, the process advances to S4. If S3 determines "NO," which means that the starter motor 16 is not being driven, the process advances to S6.

S4 keeps the main power source 5 supplying electric power to the electric motor 3. More specifically, S4 keeps the ON position (connected position) of the first switch element 14 and the OFF position (disconnected position) of the second switch element 15 as set in S1. The state where the electric motor 3 receives the power supply from the main power source 5 in S4 corresponds to each of third and fifth states of the invention.

As described above, when the voltage V1 of the main power source 5 is lower than the threshold value Va (when S2 determines YES), and the starter motor 16 is being driven (when S3 determines YES), the first switch element 14 remains in the ON position to allow the power supply from the main power source 5 to the electric motor 3, and the second switch element 15 remains in the OFF position to block the power supply from the auxiliary power source 10 to the electric motor 3. This prevents power consumption from the auxiliary power source 10, which is caused by power supply to the electric motor 3.

Since the first switch element 14 and the second switch element 15 are not switched between the ON and OFF positions, brake control can be continued without deactivating the electric motor 3. This prevents the brake pedal from being pushed back (feeling of a step-like motion of the brake pedal) by deactivation of the electric motor 3.

In S4, the voltage V2 of the auxiliary power source 10 is higher than the voltage V1 of the main power source 5 (V2>V1) since the voltage V1 of the main power source 5 is lower than the threshold value Va in S2. In S4, therefore, the controller 18 receives the power supply from the auxiliary power source 10, and the electric motor 3 receives the power supply from the main power source 5.

The subsequent S5 makes a determination as to whether the braking force is deficient. More specifically, the power supply controlling section 19 calculates a necessary braking force F1 from a stroke amount of the brake pedal, which has been detected by the stroke sensor 4. The power supply controlling section 19 further calculates a braking force F2 which can be generated by the electric motor 3 at the voltage V1 of the main power source 5. The power supply controlling section 19 then determines whether the braking force F2 which can be generated by the electric motor 3 is enough to obtain the necessary braking force F1 (F2>F1). If S5 determines "YES," which means that the braking force is deficient, the process advances to S6. If S5 determines "NO," which means that the braking force is not deficient, the process advances to S7.

Figure 2:
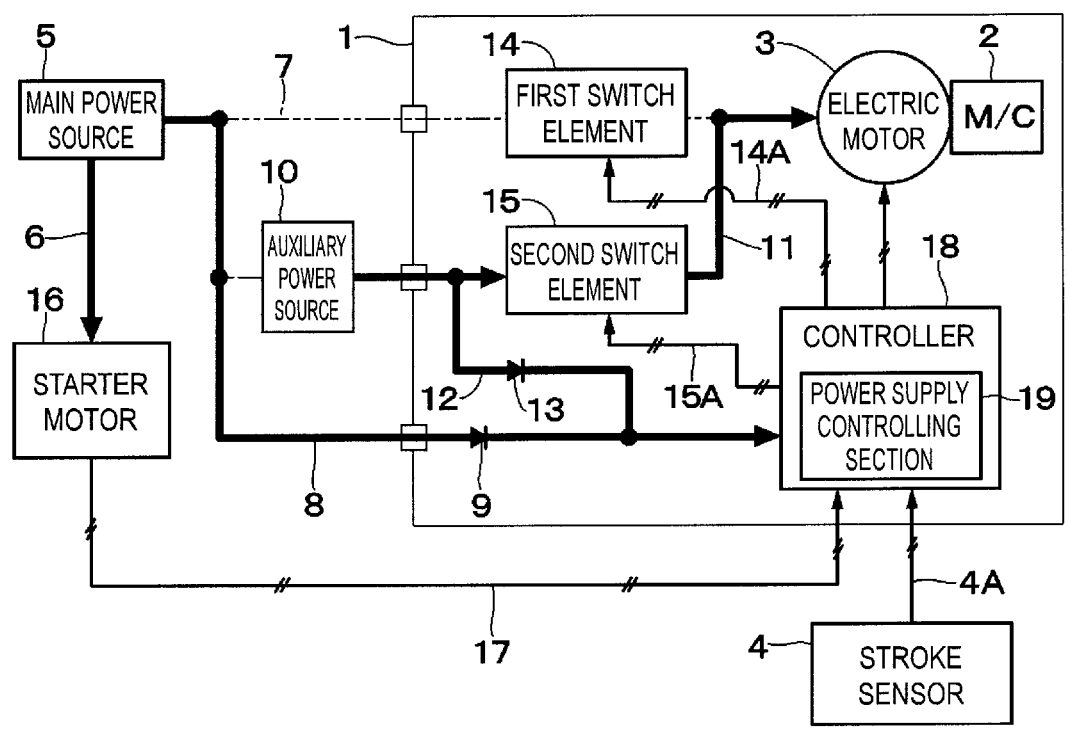
FIG. 2 is a configuration diagram in which the electric motor receives power supply from an auxiliary power source.

In S6, the power supply from the main power source to the electric motor 3 is switched to the power supply from the auxiliary power source 10 to the electric motor 3. More specifically, the power supply controlling section 19 turns the first switch element 14 to the OFF position (disconnected position) and the second switch element 15 to the ON position (connected position). The electric motor 3 thus receives the power supply from the auxiliary power source 10 as illustrated in FIG. 2. The controller 18 is allowed to receive the power supply from both the main power source 5 and the auxiliary power source 10.

Since the first switch element 14 is in the OFF position in the above-described state, the main power source 5 is not allowed to supply electric power to the electric motor 3. The controller 18 receives the power supply from either the main power source 5 or the auxiliary power source 10, whichever has higher voltage between the voltages V1 and V2. The state where the electric motor 3 receives the power supply from the auxiliary power source 10 as the result of the "NO" determination in S3 corresponds to each of second and fourth states of the invention.

S7 keeps the main power source 5 supplying electric power to the electric motor 3. More specifically, S7 keeps the first switch element 14 in the ON position (connected position) and the second switch element 15 in the OFF position (disconnected position) as set in S1. S7 then returns to the start.

S8 in FIG. 4 makes a determination as to whether the voltage V1 of the main power source 5 is equal to or higher than the threshold value Vb (V1≥Vb). The power supply controlling section 19 detects the voltage V1 of the main power source 5 on the basis of the detection signal from the voltage detection circuit and compares the voltage V1 with the threshold value Vb. The threshold value Vb is set equal to or higher than the threshold value Va mentioned in S2 (Va≤Vb). If S8 determines "YES," which means that the voltage V1 of the main power source 5 is equal to or higher than the threshold value Vb, the process advances to S9. If S8 determines "NO," which means that the voltage V1 of the main power source 5 is lower than the threshold value Vb, the process advances to S11.

S9 makes a determination as to whether the driving of the starter motor 16 is discontinued. More specifically, if S3 in FIG. 3 determines "YES," S9 determines whether the starting of the engine is completed, and the driving of the starter motor 16 is discontinued. If S9 determines "YES," which means that the driving of the starter motor 16 is discontinued, the process advances to S10. If S9 determines "NO," which means that the driving of the starter motor 16 is not discontinued, the process advances to S11.

S10 makes a determination as to whether the brake pedal is being depressed. More specifically, S10 determines whether the operator is depressing the brake pedal to apply the braking force. In this case, whether the braking pedal is being depressed can be determined from whether the braking demand signal is outputted from the stroke sensor 4. If S10 determines "YES," which means that the brake pedal is being depressed, the process advances to S11. If S10 determines "NO," which means that the brake pedal is not being depressed, the process advances to S12.

S11 keeps the auxiliary power source 10 supplying electric power to the electric motor 3. More specifically, S11 keeps the first switch element 14 in the OFF position (disconnected position) and the second switch element 15 in the ON position (connected position) as set in S6 of FIG. 3. S11 then returns to S8. The controller 18 is supplied with electric power from either the main power source 5 or the auxiliary power source 10, whichever has higher voltage.

Even when the voltage V1 of the main power source 5 becomes equal to or higher than the threshold value Vb ("YES" in S8), if the starter motor 16 is being driven ("NO" in S9), the power supply to the electric motor 3 is continued using the auxiliary power source 10. This prevents the power source of the electric motor 3 from being frequently switched between the main power source 5 and the auxiliary power source 10 due to voltage fluctuations at the time of cranking when the starter motor 16 is driven.

Even when the voltage V1 of the main power source 5 becomes equal to or higher than the threshold value Vb ("YES" in S8), the auxiliary power source 10 continues to supply electric power to the electric motor 3 as long as the brake pedal is being depressed ("YES" in S10). This prevents the control on the electric motor 3 from being discontinued when the power supply to the electric motor 3 is switched. It is then possible to eliminate or reduce the feeling of the step-like motion of the brake pedal, which is caused by a temporal returning motion of the brake pedal at the discontinuation of control on the electric motor 3 and a downward motion of the brake pedal at the restart of the control.

In S12, the power supply from the auxiliary power source to the electric motor 3 is switched to the power supply from the main power source 5 to the electric motor 3. More specifically, the power supply controlling section 19 turns on the first switch element 14 (connected position) and turns off the second switch element 15 (disconnected position). S12 then returns to the start. As described, when the voltage V1 of the main power source 5 is equal to or higher than the threshold value Vb ("YES" in S8), the power supply to the electric motor 3 is switched to the main power source 5 if the starter motor 16 is not being driven ("NO" in S9), and the brake pedal is not being depressed, that is, if the electric motor 3 is not being driven ("NO" in S10). This prevents the power supply from being temporarily suspended while the starter motor 16 and the electric motor 3 are being driven, thus enabling smooth driving of the starter motor 16 and the electric motor 3.

According to the present embodiment, the controller 18 is supplied with electric power from the auxiliary power source 10 when the voltage of the main power source 5 is decreased as the result of the driving of the starter motor 16. The controller 18 is therefore prevented from being reset. Furthermore, since the power supply to the electric motor 3 is prevented from being switched from the main power source 5 to the auxiliary power source 10 every time the starter motor 16 is driven at the time of idling stop, the auxiliary power source 10 is prevented from being decreased in its remaining power.

The foregoing embodiment has been discussed with the example in which the controller 18 determines whether the starter motor 16 is being driven (determination in S3) on the basis of the detection signal from the starter motor 16. However, the invention is not limited to this example. For another example, the starter motor 16 may be determined to be driven when the vehicle is determined to be parked on the basis of vehicle speed, the brake pedal, and an accelerator pedal.

The controller 18 may determine whether the starter motor 16 is being driven, by detecting the driving and stopping of the engine from engine speed. The controller 18 also may determine whether the starter motor 16 is being driven, by detecting idling stop. The controller 18 also may determine whether the starter motor 16 is being driven, using a GPS (Global Positional System) or the like device to detect positional information on whether the vehicle is located at an intersection, whether the vehicle is located at a parking lot, and like information.

The foregoing embodiment has been discussed with the example in which a determination is made as to the excess and deficiency of the braking force that can be generated by the electric motor 3 at the voltage of the main power source 5 (determination in S5). However, the invention is not limited to this example. For another example, whether the braking force can be obtained may be determined on the basis of electric current flowing through the electric motor 3. Whether the braking force can be obtained may also be determined on the basis of the fluid pressure generated within the master cylinder 2. Whether the braking force can be obtained may also be determined on the basis of a position of a piston within the master cylinder 2, which has been activated by the electric motor 3. Whether the braking force can be obtained may also be determined by detecting the traveling (or stopping) of the vehicle. Whether the braking force can be obtained may also be determined by detecting that the vehicle is not being decelerated.

The foregoing embodiment has been discussed with the example in which the necessary braking force F1 is calculated from the stroke amount of the brake pedal, which has been detected by the stroke sensor 4 (determination in S5). However, the invention is not limited to this example. For another example, the necessary braking force F1 may be calculated on the basis of a braking force which is needed to satisfy a braking demand from another external unit that is installed in the vehicle. The demanded braking force also may be calculated by detecting a condition of a road on which the vehicle is located.

The foregoing embodiment has been discussed with the example in which the power supply to the electric motor 3 is switched to the main power source 5 when the voltage V1 of the main power source 5 becomes equal to or higher than the threshold value Vb ("YES" in S8). However, the invention is not limited to this example. For another example, the power supply to the electric motor 3 may be switched to the main power source 5 when the voltage of the main power source 5 becomes equal to or higher than the threshold value Vb, and the remaining power of the auxiliary power source 10 becomes equal to or lower than a predetermined value, on the condition that the first switch element 14 is off (disconnected position), and that the second switch element is on (connected position) (state illustrated in FIG. 2).

Inventions included in the foregoing embodiment will be discussed below. The present invention is characterized in that, in the third state, when the braking force which is outputted by the electric motor using the electric power supplied from the first power storage device is deficient to obtain the necessary braking force based on the braking demand signal, the electric motor receives the power supply from the second power storage device. This prevents the deficiency of the power supply to the electric motor 3 and thus makes it possible to obtain the necessary braking force.

The invention is further characterized in that the electric motor continues to be supplied with electric power from the second power storage device until the starting system is stopped. This prevents the power source for supplying electric power to the electric motor 3 from being frequently switched due to voltage fluctuations caused at the time of cranking of the starter motor 16.

The invention is further characterized in that the electric motor continues to be supplied with electric power from the second power storage device as long as the brake pedal is being depressed. This prevents the discontinuation of control on the electric motor 3, which is caused by switching the power source for supplying electric power to the electric motor 3, and thus eliminates or reduces the feeling of the step-like motion of the brake pedal.

Braking systems based on the above-discussed embodiment include, for example, the ones configured according to the following aspects.

In a first aspect, the invention is a braking system comprising an electric motor configured to output a braking force in accordance with a braking demand signal, and a controller configured to control the electric motor, wherein the electric motor and the controller are supplied with electric power from a first power storage device which supplies electric power to a starting system of an internal combustion engine installed in a vehicle, and a second power storage device which is independent from the first power storage device; the controller is supplied with electric power from both the first and second power storage devices; the electric motor has a first state in which the electric motor is supplied with electric power from the first power storage device when the first power storage device has a voltage equal to or higher than a first predetermined value, a second state in which the electric motor is supplied with electric power from the second power storage device when the starting system is not being driven, and the first power storage device has a voltage lower than the first predetermined value, and a third state in which the electric motor is supplied with electric power from the first power storage device when the starting system is being driven, and the first power storage device has a voltage lower than the first predetermined value.

In a second aspect according to the first aspect, in the third state, the electric motor is supplied with electric power from the second power storage device when the braking force which is outputted by the electric motor using the electric power supplied from the first power storage device is deficient to obtain a necessary braking force based on the braking demand signal.

In a third aspect according to the second aspect, the electric motor continues to be supplied with electric power from the second power storage device until the starting system is stopped.

In a fourth aspect according to the second or third aspect, when the braking pedal is being depressed, the electric motor continues to be supplied with electric power from the second power storage device.

In a fifth aspect, the invention is a braking system comprising an electric motor configured to generate a braking force in accordance with a braking demand signal, and a controller configured to control the electric motor, wherein the electric motor and the controller are supplied with electric power from a first power storage device which supplies electric power to a starting system of an internal combustion engine installed in a vehicle and a second power storage device which is independent from the first power storage device, and the power supply from the second power storage device has a fourth state in which the second power storage device supplies electric power to the electric motor and the controller when the first power storage device has a voltage lower than a first predetermined value, a fifth state in which the second power storage device does not supply electric power to the electric motor but supplies electric power to the controller on the condition that the starting system is being driven, and a sixth state in which the second power storage device does not supply electric power to the electric motor and the controller.

In a sixth aspect, the invention is a vehicle comprising an electric motor configured to generate a braking force in accordance with a braking demand signal; a controller configured to control the electric motor; a starting system configured to start an internal combustion engine; a first power storage device configured to supply electric power to the starting system; a second power storage device which is independent from the first power storage device; and a power supply controlling section configured to control power supply from the first power storage device and the second power storage device to the electric motor and the controller, wherein the power supply controlling section switches the power supply from the second power storage device to a fourth state in which the second power storage device supplies electric power to the electric motor and the controller when the first power storage device has a voltage lower than a first predetermined value, a fifth state in which the second power storage device does not supply electric power to the electric motor, but supplies electric power to the controller, on the condition that the starting system is being driven, and a sixth state in which the second power storage device does not supply electric power to the electric motor and the controller.

The foregoing description refers to only a few embodiments of the invention. One skilled in the art should easily understand that the exemplary embodiments may be modified or improved in various ways without materially deviating from the novel teachings and advantages of the invention. Accordingly, all such modifications and improvement are intended to be included within the technical scope of the invention. The embodiments may be combined in any ways.

The present application claims priority under Japanese Patent Application No. 2016-105119 filed on May 26, 2016. The entire disclosure of Japanese Patent Application No. 2016-105119 filed on May 26, 2016, including the description, claims, drawings and abstract, is incorporated herein by reference in its entirety.

REFERENCE SIGNS LIST

1 Braking system
3 Electric motor
5 Main power source (first power storage device)
10 Auxiliary power source (second power storage device)
16 Starter motor (starting system)
18 Controller
19 Power supply controlling section

The invention claimed is:

1. A braking system comprising:
an electric motor configured to output a braking force in accordance with a braking demand signal, and
a controller configured to control the electric motor, wherein
the electric motor and the controller are supplied with electric power from a first power storage device which supplies electric power to a starting system of an internal combustion engine installed in a vehicle and a second power storage device which is independent from the first power storage device;
the controller is supplied with electric power from the first power storage device and the second power storage device; and
the electric motor includes:
a first state in which the electric motor is supplied with electric power from the first power storage device when the first power storage device has a voltage equal to or higher than a first predetermined value;
a second state in which the electric motor is supplied with electric power from the second power storage device when the starting system is not being driven, and the first power storage device has a voltage lower than the first predetermined value; and
a third state in which the electric motor is supplied with electric power from the first power storage device when the starting system is being driven, and the first power storage device has a voltage lower than the first predetermined value.

2. The braking system according to claim 1, wherein in the third stage,
the electric motor is supplied with electric power from the second power storage device when a braking force which is outputted by the electric motor using the power supplied from the first power storage device is deficient to obtain a necessary braking force based on the braking demand signal.

3. The braking system according to claim 2, wherein the electric motor continues to be supplied with electric power from the second power storage device until the starting system is stopped.

4. The braking system according to claim 2, wherein the electric motor continues to be supplied with electric power from the second power storage device as long as a brake pedal is being depressed.

5. A braking system comprising:
an electric motor configured to generate a braking force in accordance with a braking demand signal, and
a controller configured to control the electric motor, wherein
the electric motor and the controller are supplied with electric power from a first power storage device which supplies electric power to a starting system of an internal combustion engine installed in a vehicle and a second power storage device which is independent from the first power storage device; and
the electric power supplied from the second power storage device includes:
a fourth state in which the second power storage device supplies electric power to the electric motor and the controller when the first power storage device has a voltage lower than a first predetermined value;
a fifth state in which the second power storage device does not supply electric power to the electric motor, but supplies electric power to the controller, on the condition that the starting system is being driven; and
a sixth state in which the second power storage device does not supply electric power to the electric motor and the controller.

6. A vehicle comprising:
an electric motor configured to generate a braking force in accordance with a braking demand signal;
a controller configured to control the electric motor;
a starting system configured to start an internal combustion engine;
a first power storage device configured to supply electric power to the starting system;
a second power storage device which is independent from the first power storage device; and
a power supply controlling section configured to control power supply from the first power storage device and the second power storage device to the electric motor and the controller, wherein
the power supply controlling section switches the power supply from the second power storage device to
a fourth state in which the second power storage device supplies electric power to the electric motor and the controller when the first power storage device has a voltage lower than a first predetermined value;
a fifth state in which the second power storage device does not supply electric power to the electric motor, but supplies electric power to the controller, on the condition that the starting system is being driven; and
a sixth state in which the second power storage device does not supply electric power to the electric motor and the controller.

* * * * *